US005492592A

United States Patent [19]

Bergholtz et al.

[11] Patent Number: 5,492,592

[45] Date of Patent: Feb. 20, 1996

[54] METHOD AND DEVICE FOR ARRANGING A POURING DEVICE ON A PACK

[75] Inventors: Lars Bergholtz, Darmstadt; Hans Kindinger, Bensheim; Reiner Pfuhl, Dieburg, all of Germany

[73] Assignee: Tetra Laval Holdings & Finance S.A., Pully, Switzerland

[21] Appl. No.: 108,451

[22] Filed: Aug. 19, 1993

[30] Foreign Application Priority Data

Aug. 25, 1992 [DE] Germany .......................... 42 28 181.4

[51] Int. Cl.[6] .......................................... B32B 31/00

[52] U.S. Cl. ....................... 156/556; 156/308.2; 156/499; 156/514; 53/133.2; 264/545

[58] Field of Search ............................. 156/308.2, 308.4, 156/309.9, 513, 514, 498, 499, 556, 559, 423; 53/477, 478, 133.1, 133.2; 264/545

[56] References Cited

U.S. PATENT DOCUMENTS

| | | | |
|---|---|---|---|
| 2,768,106 | 10/1956 | Sartakoff | 154/83 |
| 2,972,184 | 2/1961 | Andrew | 53/133.2 X |
| 3,323,274 | 6/1967 | Justus | 53/30 |
| 3,557,520 | 1/1971 | Morton et al. | 53/37 |
| 3,919,374 | 11/1975 | Komendowski | 264/90 |
| 4,152,566 | 5/1979 | Mägerle | 219/10.53 |
| 4,238,267 | 12/1980 | Konstantin | 156/380 |
| 4,959,190 | 9/1990 | Pfeiffer et al. | 264/516 |
| 5,297,375 | 3/1994 | Reil et al. | 53/133.2 X |

FOREIGN PATENT DOCUMENTS

| | | |
|---|---|---|
| 0433634 | 6/1991 | European Pat. Off. . |
| 687941 | 10/1966 | France . |
| 2367601 | 7/1978 | France . |
| 1166452 | 3/1964 | Germany . |
| 1479080 | 2/1969 | Germany . |
| 3742993 | 11/1988 | Germany . |
| 3929664 | 3/1991 | Germany . |

*Primary Examiner*—James Engel
*Attorney, Agent, or Firm*—Burns, Doane, Swecker & Mathis

[57] ABSTRACT

A device for arranging a closable pouring device with respect to a hole in the end of a pack includes a mandrel wheel which is rotated intermittently about an axis of rotation. The mandrel wheel is provided with four mandrels which project radially from a hub. Arranged in the region of the outer periphery of the mandrel wheel at angular spacings with respect to the axis of rotation is a set-down station and adjacent heating station, followed by a sealing station and a stripper station in such a way that the outer end of each mandrel is capable of engaging in a step-wise manner each of the stations successively.

18 Claims, 6 Drawing Sheets

5
44
4
38
7
6
8
100
1
11
46
41
42
35
34
47
36
40
37
IV
39
43
9
3

METHOD AND DEVICE FOR ARRANGING A POURING DEVICE ON A PACK

FIELD OF THE INVENTION

The invention relates to a method and a device for arranging a closable pouring device on the hole in the top of a pack, wherein the device has a mandrel wheel which is rotated intermittently about an axis of rotation and having at least two mandrels which project radially from a hub.

BACKGROUND OF THE INVENTION

Many packs are known where the tops have at least one surface which is coated with thermoplastics material and which has a hole which has to be closed, in a way which can be opened, by means of a closable pouring device. By way of example, packs for liquids exist, particularly for milk or juices, which are provided with closable pouring devices prior to or subsequent to being filled and which can be closed in a re-openable way.

A proposal has also been made to make packs for liquids from a deep-drawable plastics material by joining two deep-drawn half-shells, so that a pack for liquids is produced which has a top in which a hole is provided for the purpose of filling the pack. Other attempts have been made to join the hole to a pouring device which is still in the open condition, when the pack is still unfilled, so that liquid can be filled into it by using the pouring device which is still open and the hole in the top of the pack.

Attempts within this technical domain to arrange a pouring device of this kind in the hole in the top of a pack for liquids have resulted in even better closure devices.

A proposal has also already been made for pouring devices composed of two parts joined together by a hinge, the annular bottom of which has a pouring opening which can be sealingly closed by folding over the pack the closure part which pivots by way of the hinge. A pouring device of this kind has an open condition in which the closure part is pulled cut and folded up from the bottom by way of the link-like hinge; and a closed condition in which the closure part is pivoted down onto the bottom by way of the link-like hinge and is pressed into the bottom so that the pouring opening is sealingly closed by the closure part.

SUMMARY OF THE INVENTION

The present invention is concerned with arranging a pouring device of this kind on the hole in the top of a pack which is made of a material which is capable of being sealed to the plastics material of the pouring device, either all the way through or at the surface.

The aim of the present invention is to create an arrangement method and device of the kind mentioned in the introduction which make it possible for costs to be saved on the machine and on material for the product, and for which allow the reliability and hygiene requirements to be improved during the arranging operation.

This problem is solved according to the invention in that the pouring device is heated and introduced between at least two just deep-drawn shell parts of the pack, where corresponding openings are disposed in the shell parts of the pack, to the surfaces of which the pouring device is sealed when the pouring device and the, at least, two shell parts of the pack ape sealed simultaneously by pressing the surfaces to be joined at the sealing temperature. By way of the deep-drawing process for making the shell parts of the pack which are preferably pack half-shells, these are still at a higher temperature than ambient temperature, i.e. they contain a residual heat. A short time (between half a second and five seconds, preferably between one second and two seconds) after the deep-drawing process has been concluded, the two part shells which are to form one complete hollow pack are moved towards each other, whilst the heated pouring device is simultaneously brought and held at a specific, desired place so that the, at least, three parts which are to be sealed together are brought together simultaneously. This makes it possible for the pouring device to be pressed and sealed to the at least two shell parts of the pack by making use of the residual heat. As can be seen, savings are made in terms of cost both on the machine and on material, and improvements are also made in terms of reliability and also hygiene requirements of the new pack. It will be appreciated that the pouring device is arranged in an appropriate opening in the shells forming the parts of the pack, thus along surfaces which are reciprocally shaped accordingly.

With respect to the device, the problem is solved according to the invention in that in the region of the outer periphery of the mandrel wheel arranged at angular spacings relative to the axis of rotation a set-down station, an adjacent heating station, a sealing station and a stripper station are arranged in such a way that the outer end of each mandrel is able to engage in step-wise manner with the stations successively. The pouring device is expediently pre-heated. It is arranged preferably by utilising the residual heat present in the pack.

It can be imagined that a pouring device is arranged on the hole in the pack wall by sticking additionally applied adhesive, by additionally applied hot melt or by injecting an appropriate pouring device directly onto the hole in the top of the pack. None of these conceivable features is employed by the invention. Instead, with the new arrangement device, a mandrel wheel is arranged so that it moves inside four stations in such a way that the mandrel in question engages the individual stations successively so that in the first set-down station the pouring device which is to be joined to the hole of the pack is set down held to the mandrel, so that this together with the pouring device placed thereon is then brought to a heating station in which heat for heating the plastics material is applied, preferably from the outside, onto the surface of the pouring device to be sealed which is preferably annular, until a sealable condition is obtained; whereupon the mandrel moves further so as to engage a sealing station where the pouring device is joined to the pack by being pressed against the corresponding inner surfaces of the hole in the top of the pack; and finally, the outer end of the mandrel engages with a stripper station where the pouring device, together with the pack which is sealed firmly thereto, is stripped from the mandrel and is supplied to other devices which are placed downstream of the arrangement device according to the invention.

By way of the new type of arrangement device for the pouring devices it is possible to considerably reduce leakage rates from packs for liquids. A device which is technically simple in design can be used to reliably provide packs for liquids with pouring devices with a high throughput in such a way that after arranging the pouring devices, it may be possible to fill the pack and to then close the pouring device. No adhesives or extra quantities of hot melts need to be added, and so hygiene during the arrangement operation can be considerably improved.

According to the invention, it is particularly expedient if the mandrel wheel is movable in translatory fashion in a line from the set-down station to the sealing station and the other way, and if the heating station is constructed in two separate stages, wherein the distance between the preheating stage and the final heating stage is equal to the stroke movement of the mandrel wheel during its translatory movement. Despite the fact that this additional translatory movement makes demands upon the mandrel wheel compared with mere rotational movement thereof, this additional technical feature which is simple in its realisation makes it possible for the four afore-mentioned stations to engage close together within a very short space with the outer end of the respective mandrel, so that the output of the device according to the invention is high, but the pouring devices are still arranged in a very reliable way, with high requirements on hygiene being observed. The additional translatory movement of the mandrel wheel advantageously makes it possible for the pouring device to be brought to the desired position relative to the sealing tool. Then, after the operation in which the sealing device is sealed to the hole in the pack, the sealing device, together with the pack, can be withdrawn from the sealing tool so that it will then arrive at the stripper station by further rotation of the mandrel wheel.

The invention is advantageously further characterised in that the set-down station has a loading device which moves in a translatory fashion in a radial direction relative to the axis of the mandrel for pushing the separated pouring device onto the outer end of the mandrel when it is at a standstill. A heating stage, preferably the pre-heating stage, may be abandoned. The very simple and thus reliable construction of the set-down station is thus evident which may be supplied from a string of pouring devices simply by way of a nominal breakage line with the string of connected pouring devices, the nominal breakage line being broken by shearing effect when the loading device moves in a straight line, whereby the pouring device is separated and then pushed immediately onto the outer end of the mandrel.

It is also advantageous, if, according to the invention, the heating station of each stage has a thermal hollow body which is driven to move backwards and forwards vertically to the connecting line in a straight line between the set-down station and the sealing station. The afore-mentioned translatory movement of the mandrel wheel for engagement of the pouring device with the sealing tool and for withdrawing the pouring device together with the pack sealed thereto is advantageously also exploited for the purpose of designing a two-stage heating operation which is particularly efficient and energy-saving, so that in the one stage the pouring device is pre-heated and in the second stage it is heated subsequently to the final temperature. If the heat transmission to the pouring device is very good, it is possible to abandon one heating stage. In addition, by also making optimum use of the heat energy by way of the thermal hollow body it is possible to embrace the part of the pouring device which is to be heated so that the heat produced by the tool in the heating station can be brought to the annular surface of the pouring device which is to be heated by forced convection and radiation (hot air, gas-flame) almost completely and without any significant loss.

Whereas the mandrel wheel does not rotate, it moves in the way described in translatory fashion in a line from the set-down station to the sealing station, and therefore the, at least, one other mandrel at an angular spacing away is available with the pouring device placed on it to engage in the heating station. The afore-mentioned translatory movement of the mandrel wheel for the sealing purpose is advantageously used at the same time to convey the outer end of the other mandrel, which only carries the pouring device from the final heating stage into the pre-heating stage, and back again. When the respective stage is reached, the thermal hollow body which is designed in a particularly practical way only needs to be moved vertically to the afore-mentioned connecting line between the set-down station and sealing station onto the end of the mandrel with the pouring device or to be moved away therefrom after the heating operation.

It is also favourable, if, according to the invention, the sealing station has a sealing tool which is composed of at least two parts and which has a central dividing plane which is disposed in the extension of the plane of movement of the axis of rotation of the mandrel wheel, and if the sealing tool halves arranged laterally to the central dividing plane are movable backwards and forwards in translatory fashion by drives transversely to the central dividing plane. This also creates a simple and reliably efficient sealing station. During the course of experiments carried out within this technical domain, proposals have already been made to deep-draw pack halves made of plastics plates and to seal together the two pack halves along a central dividing plane by the application of counter-pressure, in such a way that one complete and hollow pack is produced. To this end, a deep-drawing machine has been developed which is in the form of a thermal shaping machine wherein heating plates are provided which move backwards and forwards in a straight line in the central dividing plane and which bear a plastics place of this kind on each of their oppositely disposed surfaces and which heat these to the final temperature in question in such a way that the deep-drawing cool halves can move towards the heating plate with the heated plastics plate, and deep-draw the half shells of the pack by placing a vacuum on the one side and compressed air on the other. In the case of this machine which has been developed within this technical domain, the central heating plate is then withdrawn from the space between the deep-drawing and sealing tools, without the plastics half-shells (since they have now been released and deep-drawn). At this moment, the outer end of the mandrel is guided, together with the pouring device which is placed thereon and heated to the end temperature, to the position between the sealing tools (by the aforementioned translatory movement of the mandrel wheel) where openings, preferably semi-circular openings, are provided in the deep-drawn half-shells made of plastics material, these openings being intended to be sealed to the annular pouring device. The mandrel with the heated pouring device is thus disposed in the afore-mentioned central dividing plane and the two sealing tool halves disposed laterally to this central dividing plane then move by means of drives transversely to this plane towards one another until the outer edges of the pack half shells make contact with each other and are sealed together, whilst the heated surface of the bottom of the pouring device come into sealing engagement with the corresponding matching surfaces in the openings of the pack half shells. In this way, three parts are practically sealed together simultaneously, namely the two half shells and the bottom of the pouring device. It should be noted that when this happens the closure part of the pouring device is folded up. The pouring device is actually initially placed upon the end of the mandrel in the open or folded up condition, in such a way that it is actually only the annular bottom of the pouring device which sits firmly on the end of the mandrel, whilst the closure part has no part to play with the mandrel throughout the sealing operation and throughout in the individual movements of the pouring device.

The latter mentioned forwards and backwards movement of the sealing tool halves transversely to the central dividing plane also serve, after the three parts have been sealed together, i.e. after the pouring device has been arranged on the top of the pack, to release the sealing tool halves from the product.

After the pouring device has been sealed into the top of the pack, the sealing tool halves thus move apart, and the pack together with the pouring device hangs from the respective outer end of the mandrel, whereupon the mandrel wheel moves in a translatory fashion back into the first movement position of the axis of rotation of the mandrel wheel where this latter is further rotated intermittently.

With another advantageous embodiment of the invention, the stripper station has a stripper sleeve which at least partially embraces the mandrel and which is driven slidingly on the mandrel, the stripper sleeve freeing the outer end of the mandrel in its retracted starting position. It has been mentioned hereinabove that the mandrel in question has the ready, empty pack at its outer end beyond the pouring device and that this pack is brought into the stripper station by rotation of the mandrel wheel. The stripper sleeve is disposed on the respective mandrel and moves therewith. It frees the outer end of the mandrel, so that the pouring device can be pushed on in the set-down station, heated in the heating station and joined to the pack half shells in the sealing station. All the parts are then stripped off in the stripping station, so that the stripper sleeve is pushed by a drive arranged adjacently thereto on the mandrel, slidingly parallel to the axis of the mandrel, radially outwardly in the direction of the pouring device until the radially outer front annular end of the stripper sleeve engages with the bottom of the pouring device and strips this together with the pack fixed thereto from the mandrel. Expediently, a progressive assembly line, or other conveyor device, is disposed in this region somewhat beneath the stripper station, so that the separated pack together with the sealed on pouring device then falls correctly onto the next conveyor and can be supplied to further operations.

It is particularly advantageous if the mandrel wheel has four mandrels displaced at 90° relative to one another and after each quarter rotation in the first movement position of the axis of rotation of the mandrel wheel, translatory movement is provided into the second movement position of the axis of rotation and then back again. The axis of rotation of the mandrel wheel moves, as described hereinabove, in a plane, the extension of which coincides with the central dividing plane between the sealing tools. In this plane of movement, the axis of rotation of the mandrel wheel first of all adopts an initial position of movement where the mandrel wheel undergoes intermittent rotational movement; always in this first position of movement only. Then, i.e. after each quarter turn the mandrel wheel is moved in translatory fashion onto the sealing station until the axis of rotation of the mandrel wheel has reached its second position of movement. In that position there is no rotational movement of the mandrel wheel. Instead, in this second position of movement of the axis of rotation, the pouring device is sealed into the pack half shells; and simultaneously on the mandrel moving in the direction of rotational movement, the bottom of the pouring device placed on the outer end of the mandrel is pre-heated. After this pro-heating operation and simultaneously after the pouring device has been sealed into the pack half shells, the afore-mentioned rearward movement of the mandrel wheel into the first position of movement of its axis of rotation is effected.

It is also advantageous according to the invention if arranged on the outer end of the mandrel is a mechanical clamping- or vacuum holding device and/or cooling pipes inside the mandrel. The device mentioned initially is responsible for receiving and holding the pouring device which is pushed onto the end of the mandrel in the set-down station, and the cooling pipes permit the supply of coolant, e.g. water, so that the pouring device is kept cooled from the inside, so that no deformation occurs to the closure region of the pouring device during the heating operation. Cooling also serves to harden the sealing surfaces of the pouring device.

It is also possible to provide the afore-mentioned stripper sleeve with the associated drive on each mandrel, so that the stripper sleeve together with the drive rotates with the mandrel and is available in the stripper station without any supply times, as soon as it is required. The stripper sleeve is actuated by a fixed drive when the mandrel is in a horizontal position.

To increase the throughput of the device according to the invention, it is also expedient if a plurality of mandrel wheels are fixed on a common rotating shaft. Experiments have been carried out where six mandrel wheels, for example, have been arranged at equal axial spacings apart on the common rotating shaft, so that six stations can be occupied by six pouring devices during one rotation or translatory movement. If it is remembered that with four mandrels on one mandrel wheel six times four functions can be carried out with a device of this kind with each step, then a pack filling machine is provided which has a high output whilst also being reliable and optimally meeting the high hygiene requirements.

If deep-drawable plastics material is used when the pack is produced by heating plastics plates in the above-described way and by deep-drawing, thermoplastics material, such as polypropene, can be used as the plastics material. PVC can also be used as the plastics material,wherein polypropene is also widely known as polypropylene in the trade. The pack is thus made—even together with the pouring device which can be made of the same material—of parts and materials which are easily decomposable and which can be properly re-used. With a particularly preferable embodiment it is also possible to fill the plastics material e.g. the polypropene, wherein fillers can be chalks, mica, talc, gypsum or the like. It has been shown that these types of filled plastics materials are easily decomposable, on the one hand, obviously in a totally straightforward manner and that they can be re-used or recycled by using simple methods, and, on the other hand, the properties of a plastics material are not significantly adversely affected, with the result that these types of filled plastics materials are, in particular, deep-drawable ant also sealable.

BRIEF DESCRIPTION OF THE DRAWINGS FIGURES

Further advantages, features and possible applications of the present invention will emerge from the following description given in conjunction with the accompanying drawings, wherein:

FIG. 1 is a partial cross-sectional view of the device according to the invention with the two positions of movement of the mandrel wheel which is rotated only in the first position of movement, with the sealing tool arranged above it, FIG. 2 is an enlarged cross-sectional view two mandrels of the mandrel wheel in the first position of movement of the wheel, wherein the other two mandrels are broken away, FIG. 3 is an enlarged side view of the two deployed sealing tool halves with the end of the mandrel with the pouring device placed thereupon driven in to the correct height beneath the sealing tool halves, FIG. 4 is an enlarged side view of the sealing tool halves shown in FIG. 3 illustrating the subsequent condition of the sealing tool halves after the half shells of the pack and pouring device have been sealed together, FIG. 5 is a partially broken away cross-sectional view on a smaller scale showing the condition of the sealing tool as in FIG. 4, but with the mandrel wheel also showing with the capacity for translatory movement, and FIG. 6 is an enlarged cross-sectional view of the right-hand mandrel of the mandrel wheel, the other three mandrels of which are omitted, after the pouring device with the pack sealed thereto has been stripped off and a short time prior to further rotation through 90° in the direction of the curved arrow.

DETAILED DESCRIPTION OF THE INVENTION

The overall arrangement of the arrangement device which is shown and described here by way of example only according to the invention can best be described with reference, first of all, to FIG. 1.

Figure 1:
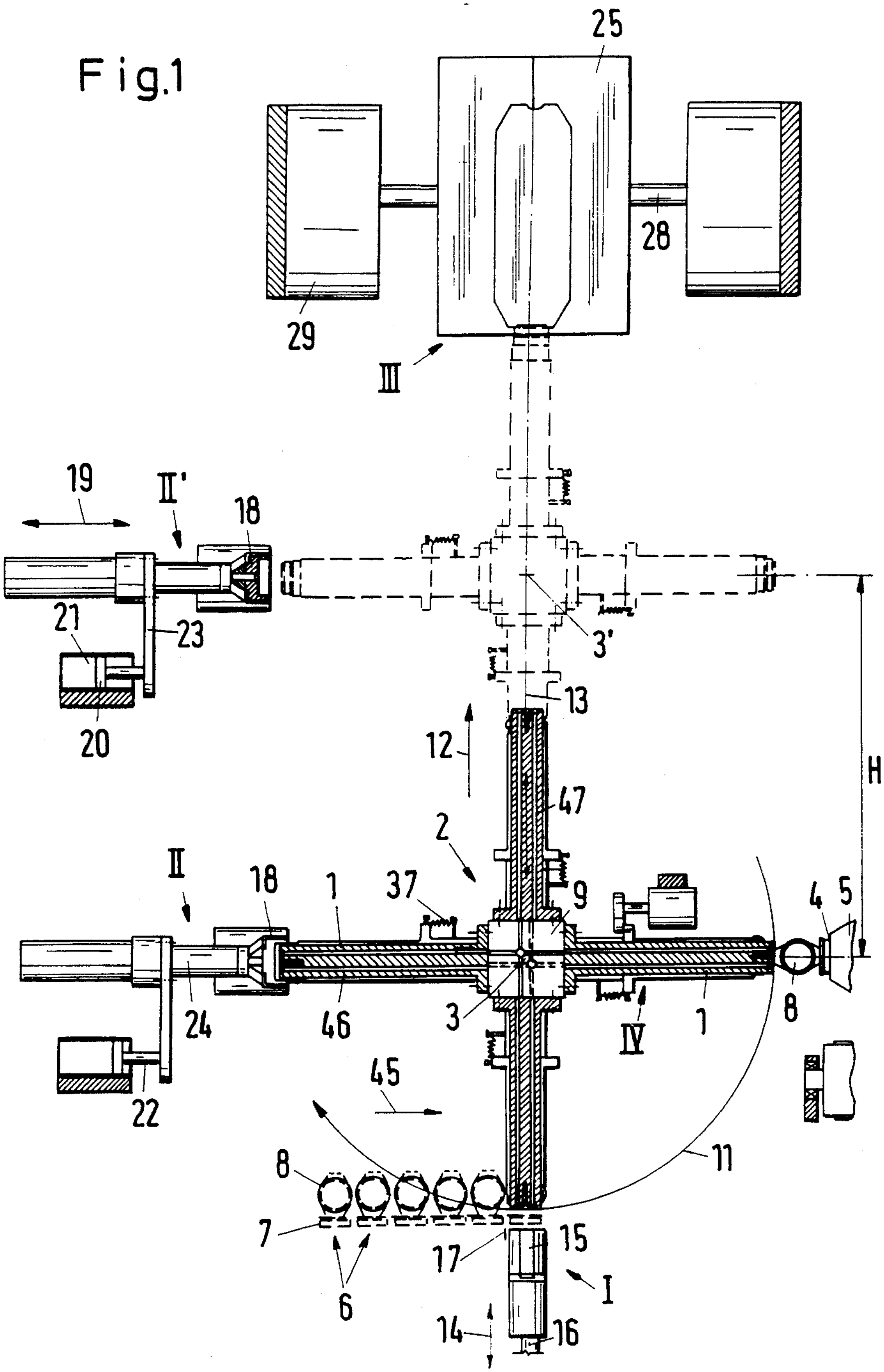
Figure 2:
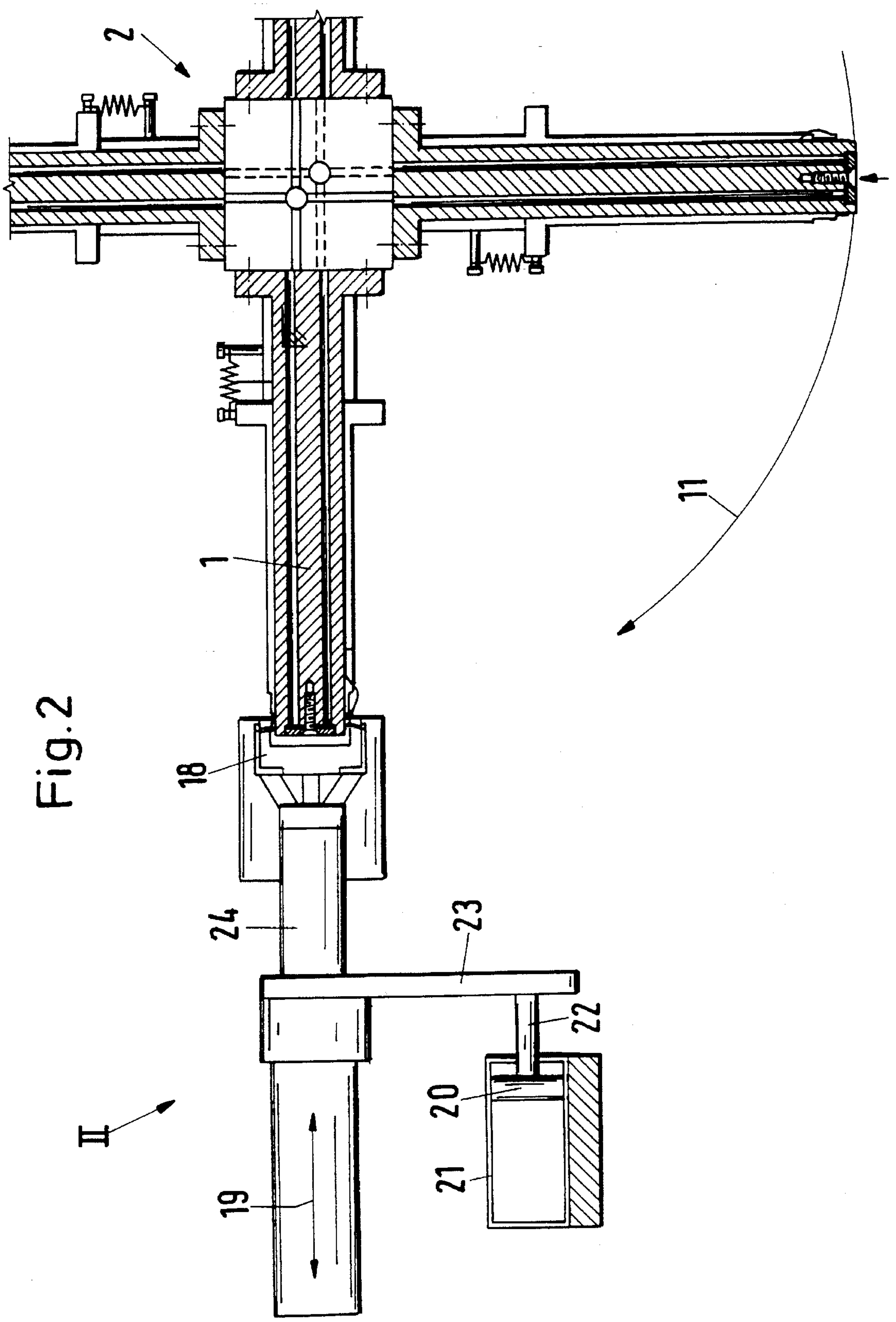

The mandrel wheel 2 which is provided with four mandrels 1 which are arranged at angular spacings of 90° apart is rotatable in a step-wise manner through 90° about the axis of rotation 3 in the first position of movement and then in translatory fashion through the stroke H from the first position of movement in FIG. 1 shown by the solid lines into the position shown by way of broken lines, and back again, wherein in the second position of movement shown by broken lines the mandrel wheel 2 is not rotated about the axis of rotation 3'.

A pouring device 6 has to be arranged in the hole, not shown, in the top 4 of a pack 5 for liquids, the pouring device consisting of a bottom 7 and a closure part 8 which is hinged by way of a hinge, not shown.

The direction of rotation of the mandrel wheel 2 and thus of its hub 9 with the mandrels 1 which are disposed vertically to the axis of rotation 3 in the first position of movement is provided in the direction of the curved arrow 11 from the set-down stations I shown to the bottom of FIG. 1 into the next heating station II which is rotated in a clockwise-direction (second stage), then in translatory fashion in the direction of the arrow 12 up to the second position of movement of the axis of rotation 3' in such a way that the mandrel in question is then located at the heating station of the first stage II' ; whilst the outer end of the next mandrel 1 which is viewed in the clockwise direction is disposed at the sealing station III; whilst, finally, the mandrel arranged further in the clockwise direction is in the withdrawn position of the first position of movement of the axis of rotation 3, in the operative region of the stripper station IV i.e. the stripper station IV is in operative engagement here. The respective outer end of the mandrel 1 is thus disposed in positions for operative engagement successively with the set-down station I, then the heating station II', II, then the sealing station III and finally the stripper station IV.

Only the set-down station I and the heating station of the second stage II (final heating) are disposed, when viewed in the direction of the axis 3 of the first position of movement in the 6 o'clock and 9 o'clock position, whilst only after the mandrel wheel 2 has moved in translatory manner upwards in the direction of the arrow 12 in such a way that the axis of rotation 3' has reached the second position of movement is the heating station II' of the first stage (pre-heating) once again in the 9 o'clock position and the sealing station III in the 12 o'clock position. Provided on each mandrel 1 are means for stripping off the pouring device 6, but these only come into operation in the bottom 3 o'clock position when the axis of rotation 3 is once again disposed in the first position of movement. The individual phases of engagement will emerge more clearly in conjunction with the following description of the mode of operation.

First of all, however, a more detailed description will be given of the structure of the individual operating stations.

The mandrel wheel 2 together with its hub 9 is movable from the set-down station I in the direction of the sealing station III in the direction of the arrow 12 and back again in such a way that the axis of rotation 3 of the first position of movement is movable in a line towards the second position of movemeat of the axis of rotation 3', and this line is disposed in the central dividing plane 13 which is tensioned by the axis of rotation of the first position of movement 3 moving backwards and forwards in translatory fashion towards the axis of rotation 3' of the second position of movement, wherein the imaginary central plane can clearly also be imagined as existing above and below it. Two mandrels extend symmetrically in this central plane 13 and the two other mandrels extend vertically thereto. The central dividing plane 13 is thus identical to the plane of movement of the axis of rotation 3 of the mandrel wheel 2.

The set-down station I has a loading device 15 with a push rod 16 which is movable backwards and forwards in a straight line in the direction of the two-directional arrow 14, the loading device and push rod being movable intermittently by a pneumatic drive, not shown, in the direction of the central dividing plane 13. A blade is arranged at the place denoted by the reference numeral 17 for cutting off a pouring device 6 from the one before it, before it is placed on the outer end of the mandrel 1.

Figure 5:
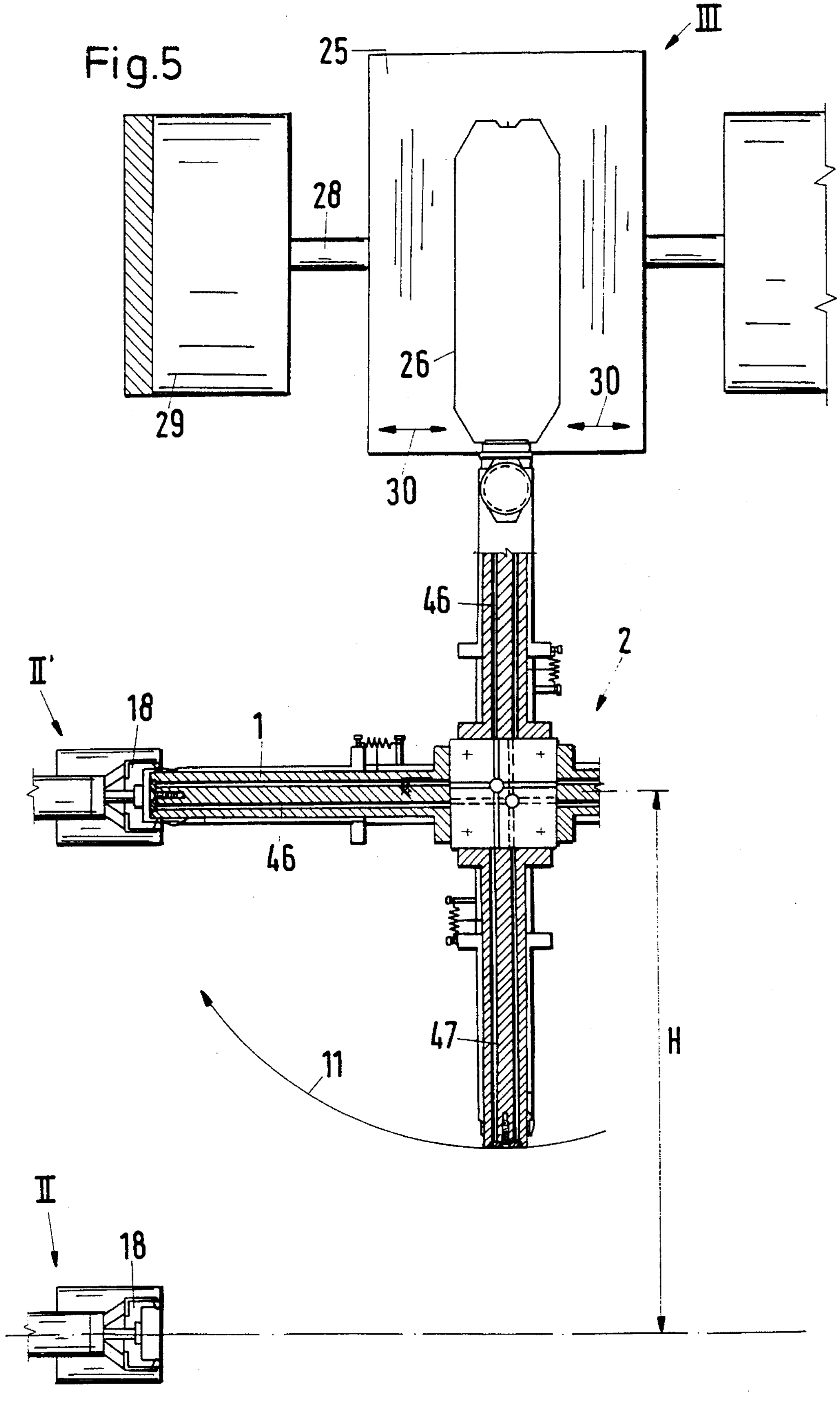

The heating station is constructed in two stages, namely the first stage of the pre-heating device II' which is shown to the top of FIGS. 1 and 5, and the second stage of the heating station II for final heating which is shown to the bottom left of FIGS. 1 and 5. The spacing between the two heating stages 2, 2' of the heating station is equal to the spacing H (FIG. 5) between the position of the axis of rotation 3 of the first position of movement and the position of the axis of rotation 3' of the second position of movement.

Each stage of the heating station II. II' is identical in design to the other, i.e. the most important part is the thermal hollow body 18 which contains the pre-heating means in the first stage of the heating station II' and which contains the final heating means in the second stage of the heating station II. The thermal hollow body 18 is constructed in such a way that it is open at the front in relation to the respective mandrel 1 of the mandrel wheel 2, and the outer end of the mandrel 1 together with the pouring device 6 placed thereon, to be more exact, its bottom 7, can be accommodated in itself when the operational position of engagement is reached. In addition, the respective thermal hollow body 18 can be-moved backwards and forwards in a straight line vertically onto the central dividing plane 13, along the two-directional arrow 19. The pneumatic intermediate piston 20 inside the pneumatic cylinder 21 is able to move a crossbar 23 backwards and forwards by way of the piston rod 22 in such a way that the guide rod 24 moves the afore-mentioned thermal hollow body 18 from the retracted position of rest shown to the top left of FIG. 1 onto the axis of rotation 3' into the second position of movement vertically towards the central dividing plane 13 to the right, as shown to the bottom left of FIG. 1 in conjunction with the heating station II in the final heating stage.

The sealing station denoted by the reference numeral III (FIGS. 1, 3 to 5) has two sealing tool halves 25 which are symmetrical with respect to the central dividing plane 13 and which have mutually facing handle-like openings 26 for each forming a pack half shell 27 in deep-drawing manner. Each sealing tool half 25 is connected by way of a drive rod 28 to a pneumatic cylinder 29 which is responsible for moving the two sealing tool halves 25 backwards and forwards in the direction of the two-directional arrows 30 through the stroke movement h. Both sealing tool halves 25 are able to move from the closed position shown in FIGS. 1, 4 and 5 through the stroke movement h into the open position shown in FIG. 3. Closure is, of course, effected in the reverse manner. During closure, the mutually facing front faces of the sealing tool halves 25 are moved towards each other until they meet and make reciprocal contact, wherein the front faces are then in alignment with the central dividing plane 13 (position in FIGS. 1, 4 and 5).

It is seen that the pack 5 for liquids is made completely from the deep-drawable plastics material described hereinabove. Therein, the pack is formed of two shell halves 27, the edges 31 of which are joined together (oppositely) (FIG. 3), so that the double-layer reinforcing rib 32 is formed which is shown in FIG. 4. On the lower side which is shown in the drawings and which is oppositely disposed to the mandrel wheel 2, this reinforcing rib 32 is interrupted by the opening device which basically consists of the closed pouring device 6 with the ready pack. In the case of the device described here, the pouring device 6 is arranged on the pack 5, half and half on the half shells 27. The arrangement takes place by way of semi-cylindrical casing-like openings 33 on the side of the subsequent pack 5 which form the top 4 of same.

Figure 3:
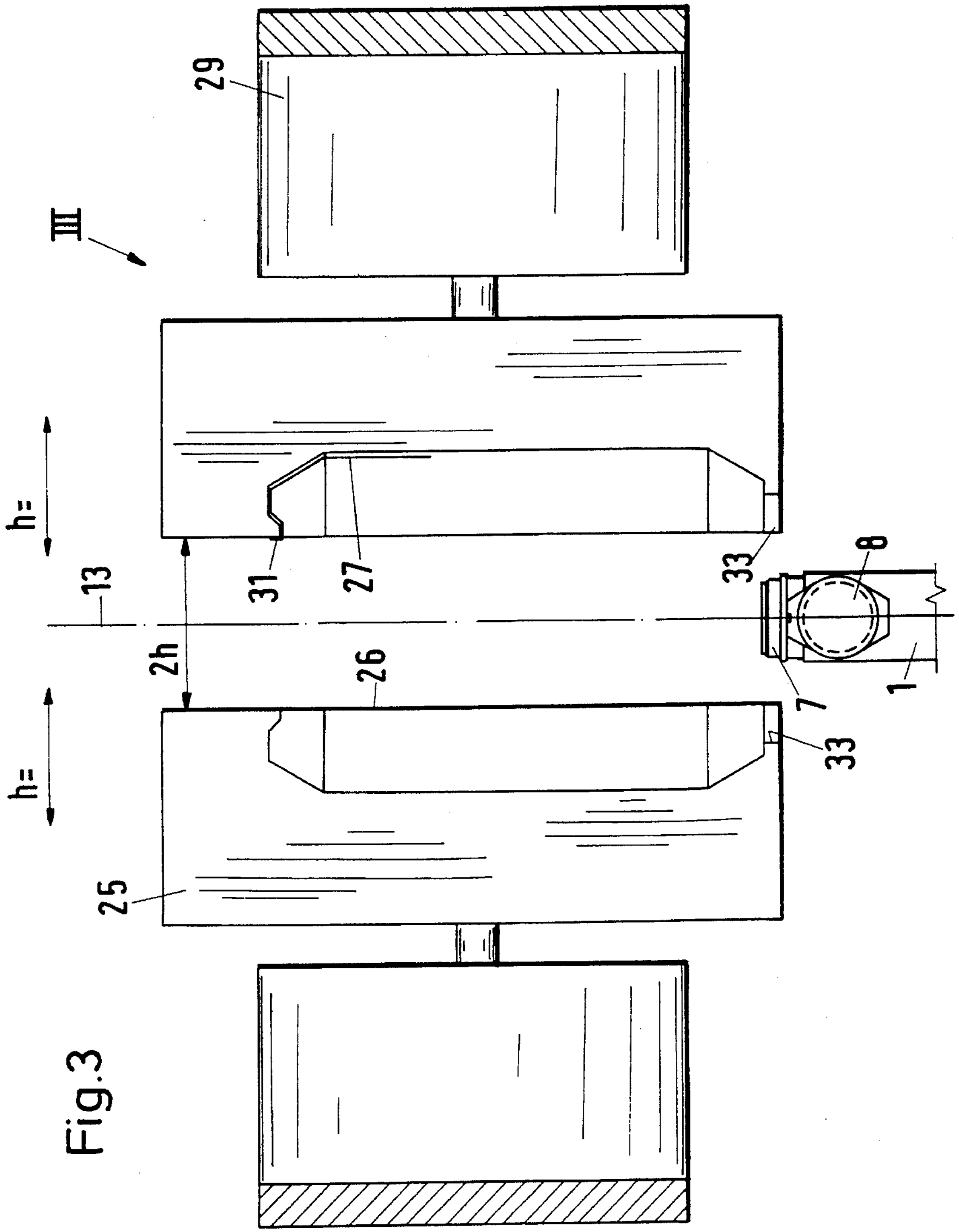
Figure 4:
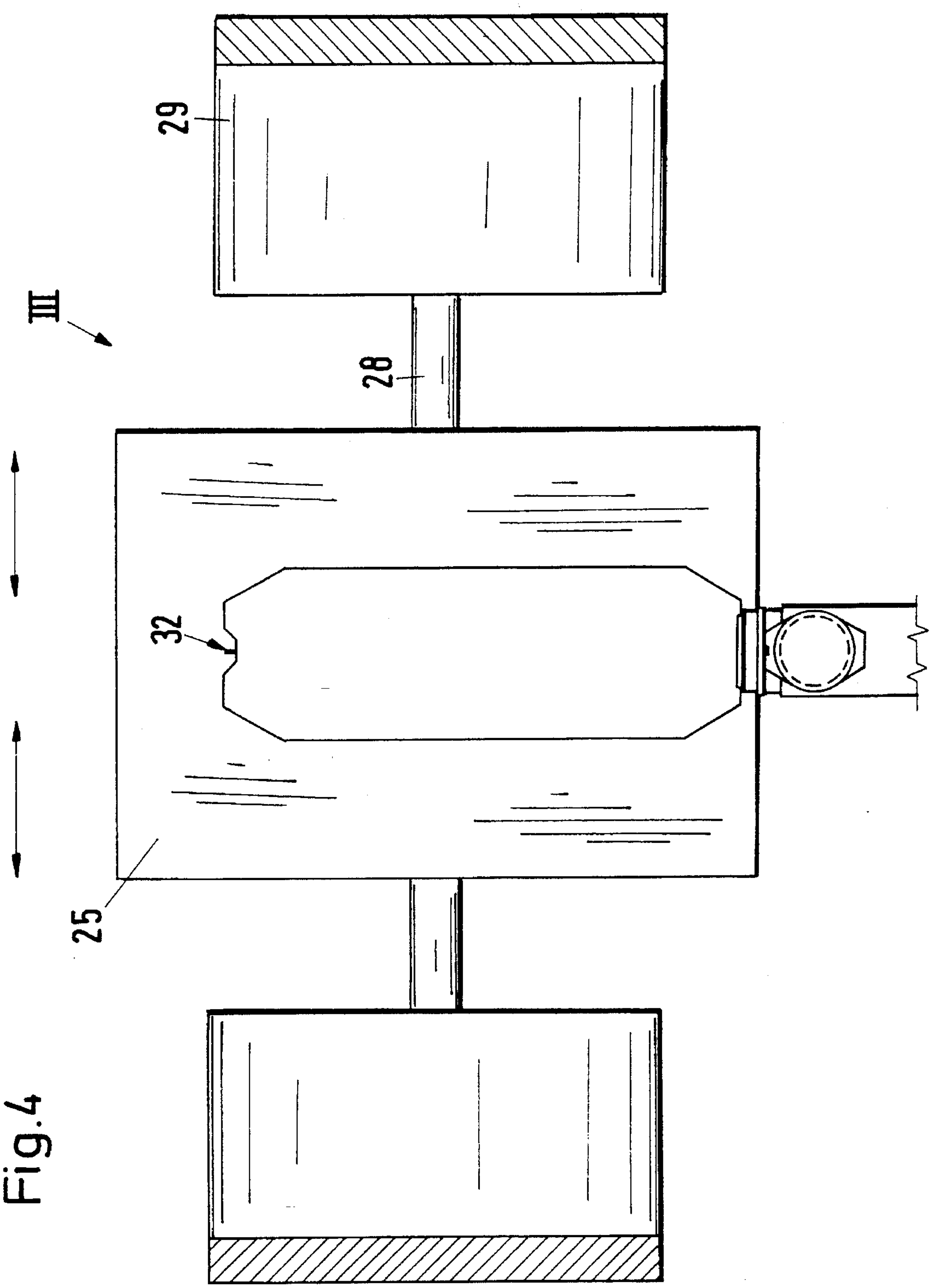

In FIG. 3 it can clearly be seen that the mandrel 1 has been moved in a translatory manner in the direction of the central dividing plane 13 upwardly to the sealing station III in The direction of the arrow 12 far enough for the semi-cylindrical casing-like surface (disposed on one side of the central dividing plane 13) of the bottom 7 of the pouring device 6 to be oppositely disposed to a corresponding annular collar 38 (FIG. 6) on the pack 5 or oppositely disposed to the half of the corresponding inner surface of the half shell 27. If the two parts to be joined together which are made of a compatible plastics material are heated accordingly and are sealable, then the sealing tool halves 25 are moved together from the position in FIG. 3 into the position in FIG. 4, and it will then be appreciated that the operation will take place whereby the annular bottom 7 of the pouring device 6 is sealed in the hole in the top 4 of the pack 5, whereby the device described here carries out its function.

Figure 6:
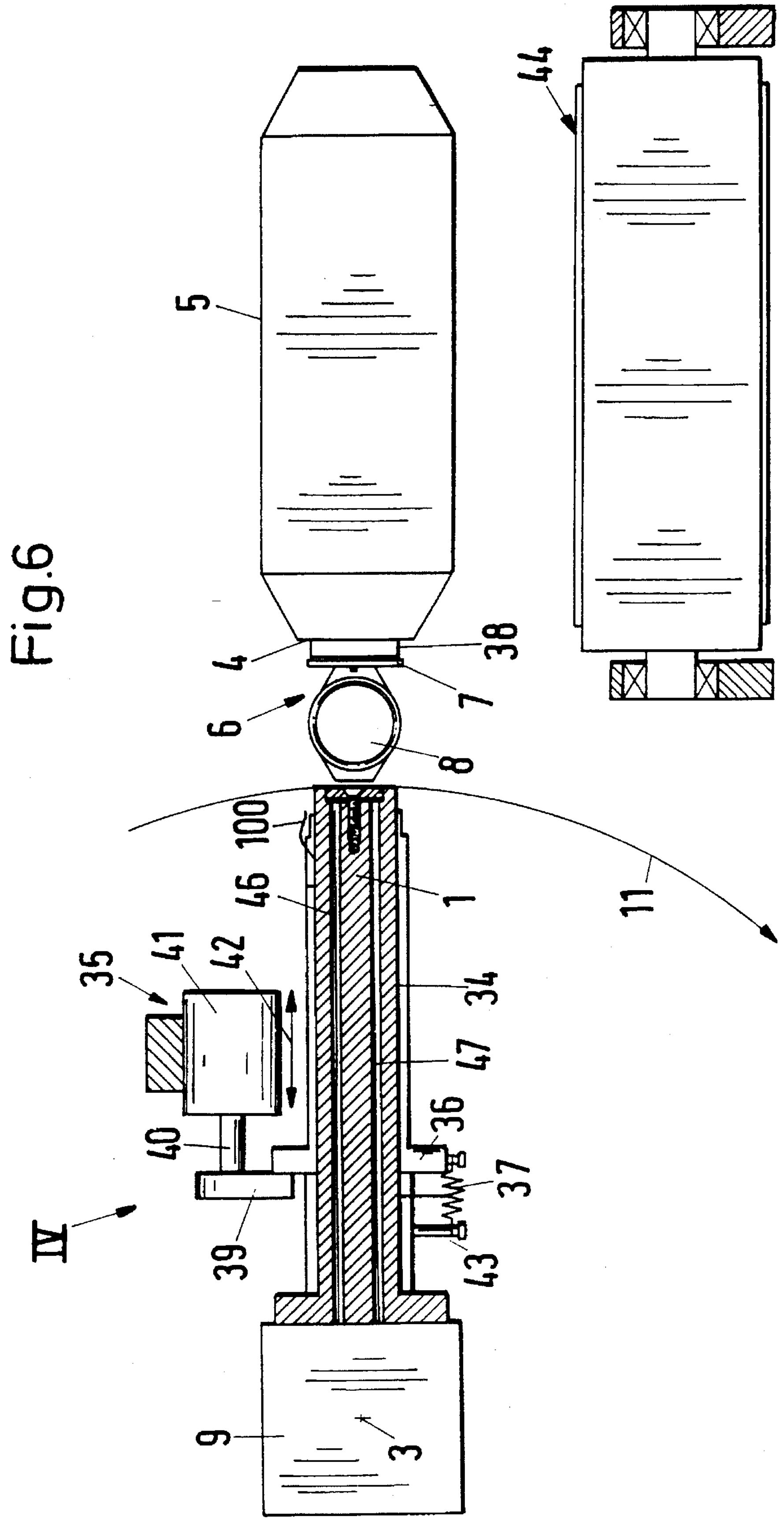

The stripper station can best be described with the aid of FIG. 6, wherein the axis of rotation 3 of the first position of movement of the hub 9 is shown for only one mandrel 1 for the purposes of clarity, this mandrel being, in the case of FIG. 1, the mandrel which projects to the right in the 3 o'clock position. The stripper station IV has a stripper sleeve 34 which is movable in sliding manner over the entire periphery of the mandrel 1 but which embraces it over only a part of its length, the stripper sleeve being shown in FIG. 6 in its retracted position.

Admittedly, the drive generally denoted by the reference numeral 35 can also be arranged on each mandrel 1, in addition to the stripper sleeve 34, and it can rotate with the mandrel wheel 2: however, with the embodiment shown here, it is assumed that a drive 35 is only present in the region of position IV, i.e. in the effective operational position of the stripper station IV, by means of which drive operative engagement is produced in the 3 o'clock position alone, shown at the bottom of FIG. 1. This happens by way of the flange 36 of the stripper sleeve 34 which is arranged on the radially inner side towards the hub 9, relative to the sleeve thereon. By way of a tension spring 37 the stripper sleeve 34 is able to be held in its retracted position at all times without engaging with the drive 35, in which position the outer end of the mandrel 1 is left free in the retracted starting position shown in FIG. 6, in such a way that the annular bottom 7 of the pouring device 6 is able to be pushed on (here just pushed off in FIG. 6).

The gripping means 39 comes into operative engagement with the annular flange 36 of the stripper sleeve 34, the gripping means being movable backwards and forwards by the piston rod 40-from the pneumatic cylinder 41 in the direction of the two-directional arrow 42, radially in the direction of the mandrel 1.

On the side of the mandrel 1 oppositely disposed to the gripping means 39 (FIG. 6, bottom), the tension spring 37 is tensioned to the flange 36, on the one hand, and to the mandrel 1, by way of the fixed screw 43.

The axis of rotation 3 of the mandrel wheel 2 is to be imagined as lying horizontally in the drawings, so that the stripped off pack 5 shown to the right in FIG. 6 and adjacent to the mandrel 1 is horizontal can fall down vertically after it is stripped off, onto a progressive assembly line 44 or another suitable conveyance device.

The arrangement device thus described operates in the following way:

A string of pouring devices 6 is supplied in a supply 45 from a supply roll onto the set-down station I in a shape similar to that shown to the bottom left of FIG. 1. Therein, the bottom 7 is separated from the closure part 8, i.e. the two parts are hinged together so that they are disposed approximately vertically to each other. The bottom 7 is annular in such a way that even after sealing in the condition shown in FIG. 6, the inside of the pack 5 is accessible from the outside through the hole in the bottom 7 by a filling device and is able to be filled.

The loading device 15 is moved in a straight line in the direction of the arrow 14 upwards radially to the axis of rotation 3 of the mandrel wheel 2 in its first position of movement, and therein uses the blade 17 to cut off the frontmost pouring device from the string of pouring devices 6 at a nominal breakage line, so that this pouring device is separated and is pushed directly onto the outer end of the mandrel 1. The loading device 15 is then withdrawn, so that the outer end of the mandrel is free again.

The mandrel wheel 2 then rotates through 90° in the direction of the curved arrow 11. After the placement operation is terminated, the mandrel wheel begins to rotate and continues to do so until the next position of rotation is reached. The end of the mandrel in question is then disposed together with the pouring device 6 placed upon it in front of the second stage comprising the heating station II, without heating taking place there. Instead, directly after the rotational movement has been completed, the translatory movement of the mandrel wheel 2 commences in the direction of the arrow 12 upwards in FIG. 1 until it reaches the position marked by broken lines, where the axis of rotation 3' has reached its second position of movement. The mandrel 1 in question is then disposed in that position, in front of the first pre-heating stage of the heating station 2'. This is activated in the way described so that the thermal hollow body 18 embraces the annular outer surface of the bottom 7 and pre-heats it.

In the meantime, another pouring device has been advanced in the direction of the arrow 45 beneath the set-down station 1. The thermal hollow body 18 is withdrawn again to the left, so that the mandrel 1 is free, and the mandrel wheel 2 is moved in translatory fashion back down in the direction opposite to the arrow 12, so that the pre-heated pouring device is now in front of the second final heating stage of the heating station II. Here, a second heating takes place up to the final temperature so that the outer surface of the bottom 7 is then sealable.

In the meantime, the half shells 27 of the pack have been shaped on both sides by deep-drawing, and are disposed at a relatively high temperature in the sealing tool 25.

After the thermal hollow body 18 has been withdrawn from the heating station II—and also after a new pouring device 6 has been pushed onto the next mandrel 1 during the final heating operation, the mandrel wheel 2 begins to rotate a second time in the direction of the arrow 11, through 90°, so that the mandrel wheel in question here has now reached the upper 12 o'clock position.

The mandrel wheel 2 in turn moves in translatory fashion in the direction of the arrow 12 into the position shown by broken lines in FIG. 1, where the two sealing tool halves 25 have previously adopted the position in FIG. 3, so that the mandrel 1 can move to the desired height between the sealing tool halves 5 to the bottom next to the openings 33. Once that position has been reached, in which the bottom 7 is of a temperature which is high enough for sealing to take place, and where the respective half shell 27 is also of a temperature which is high enough for sealing by virtue of the residual heat, the two sealing tool halves 25 move together into the position of FIG. 4. When this happens, the pouring device 6 is sealed on the one hand, and the two half shells 27 are sealed together, on the other hand, to form the pack 5.

The two sealing tool halves 25 open again, and arrive at the position like that in FIG. 3, only the pack 5 is arranged on the mandrel 1 by way of the fixture to the pouring device 6. Only-the tool halves 25 are then in the spread apart position, and the mandrel wheel 2 moves the new pack with its sealed on pouring device 6 in the central dividing plane, downwards in the direction opposite to the arrow 12.

Final sealing of the previous pouring device is effected, and the new pouring device is placed on in the set-down station 1.

The mandrel wheel 2 then rotates the mandrel 1 in question into the 3 o'clock position, so that the stripper station IV, i.e. the drive 35 comes into operative engagement with the stripper sleeve 34 (FIG. 6).

The stripping process is initiated in the above-described way by actuating the pneumatic cylinder 41, so that the flange 36 of the stripper sleeve 34 is moved to the right in the direction of the arrow 42 in such a way that the pouring device 6 together with the pack 5 arranged thereon is pushed away horizontally from the mandrel 1 into the position shown to the right in FIG. 6. When this happens, the spring 37 is extended and tensioned. Whilst the pack 5 together with its pouring device 6 falls down onto the conveyor belt 44 and is carried away, the spring 37 pulls the stripper sleeve 34, with the pneumatic cylinder 41 switched off, into the retracted starting position.

After the mandrel 1 has further rotated into the set-down station I, the aforedescribed play recommences, with the same thing happening in the same way with the following three mandrels.

The pouring device 6 in question can be held to the outer end of the mandrel 1 by a mechanical clamping effect. However, a vacuum pipe 46 can also be used to hold the pouring device by vacuum effect to the outer end of the mandrel 1. In order to prevent deformation of the closure region, the pouring device 6 can also be kept cool by coolant pipes 47.

We claim:

1. Method of arranging a pouring device made of sealable plastic material at a hole located in an end of a pack made of deep-drawable plastic material, comprising:
   - removably positioning a pouring device on a mandrel of a mandrel wheel, the pouring device including an annular lower part provided with a pouring opening and a closure part hingedly connected to the lower part;
   - moving the pouring device to position the pouring device adjacent a heating station;
   - heating the pouring device at the heating station to a sealing temperature;
   - moving the mandrel wheel in a translatory manner to move the heated pouring device to a sealing station at which is located a pair of deep-drawn shell parts which have facing surfaces to be sealed together to form a pack, the pouring device being moved to position a portion of the pouring device between a portion of the facing surfaces of the shell parts;
   - sealing the pouring device to the shell parts while simultaneously sealing the facing surfaces of the shell parts to one another to form a pack with a pouring device; and
   - removing the pouring device and the pack from said mandrel.

2. Method according to claim 1, wherein the step of moving the mandrel to position the pouring device adjacent a heating station includes rotating the mandrel wheel so that the mandrel on which is located the pouring device rotates approximately ninety degrees from the position at which the pouring device is removably positioned on the mandrel, and subsequently moving the mandrel wheel in a translatory manner to position the pouring device adjacent said heating station.

3. Method according to claim 1, wherein said heating station is a final heating station, said pouring device being heated at a pre-heating station prior to being heated to a sealing temperature at said final heating station, said mandrel wheel being moved in a translatory manner to move the pouring device from the pre-heating station to said final heating station.

4. Method according to claim 1, wherein after said sealing station said mandrel wheel is rotated approximately ninety degrees to a stripper station at which the pack and the pouring device are removed from said mandrel.

5. Method according to claim 1, wherein said mandrel wheel includes a plurality of mandrels, and wherein while the pouring device is being heated at the heating station another pouring device is attached to another mandrel of the mandrel wheel.

6. Method of sealing a pouring device made of sealable plastic material to a pack made of plastic material, comprising:
   - removably positioning a pouring device on a first mandrel of a mandrel wheel;
   - rotating the mandrel wheel to move said first mandrel and position the pouring device at a heating station;

heating the pouring device at the heating station;

moving the mandrel wheel in a translatory manner to move said first mandrel and position the pouring device at a sealing station at which is located a pair of plastic shell parts having facing surfaces to be sealed together to form a pack;

sealing the pouring device to the shell parts while also sealing the facing surfaces of the shell parts to one another to form a pack with a pour device;

rotating the mandrel wheel to move said first mandrel and position the pouring device and pack at a stripper station; and removing the pouring device and pack from said first mandrel at the stripper station.

7. Method according to claim 6, wherein said step of moving the mandrel wheel in a translatory manner includes a first translatory movement of the mandrel wheel towards said sealing station, a second translatory movement of the mandrel wheel away from said sealing station and a third translatory movement of the mandrel wheel towards said sealing station.

8. Method according to claim 7, including rotating said mandrel wheel after said second translatory movement and before said third translatory movement.

9. Method according to claim 7, wherein after said second translatory movement and before said third translatory movement another pouring device is removably positioned on another mandrel of the mandrel wheel.

10. A device for arranging a closable pouring device on a pack, comprising:

a mandrel wheel which is intermittently rotatable about a rotational axis between a plurality of angular positions;

at least two mandrels each extending radially from a hub of the mandrel wheel for removably receiving a pouring device;

a set-down station located adjacent an outer periphery of the mandrel wheel at a first angular position relative to the rotational axis for removably positioning a pouring device on the mandrels;

a heating station positioned adjacent the outer periphery of the mandrel wheel at a second angular position relative to the rotational axis for heating the pouring device removably positioned on the mandrel;

a sealing station positioned adjacent the outer periphery of the mandrel wheel at a third angular position relative to the rotational axis for sealing the heated pouring device between two shell parts to form a pack with an attached pouring device; and a stripper station positioned adjacent the outer periphery of the mandrel wheel at a fourth angular position relative to the rotational axis for removing the pouring device and pack from the mandrel, the set-down station, the heating station, the sealing station and the stripper station being spaced apart from one another and the mandrel wheel being intermittently rotated to successively advance each of the mandrels in a stepwise manner from the set down station to the heating station, to the sealing station and to the stripper station to produce packs which have a pouring device, the mandrel wheel being movable in a translatory manner over a predetermined distance towards and away from the sealing station, said heating station including a pre-heating station and a final heating station which are spaced apart by a distance substantially equal to said predetermined distance.

11. A device according to claim 10, wherein said final heating station and said pre-heating station each include a thermal hollow body which is movable in a straight-line manner towards and away from an imaginary line extending between the set-down station and the sealing station.

12. A device according to claim 10, wherein said set-down station includes a loading device which is movable in a translatory manner in a radial direction with respect to the rotational axis to push a pouting device onto an end of the mandrel positioned at the set-down station.

13. A device according to claim 10, wherein said sealing station includes a sealing device having two sealing tool halves which are symmetrical with respect to a central dividing plane, each tool half being provided with an opening for forming a pack half shell and each tool half being driven in a translatory manner in a direction transverse to the central dividing plane.

14. A device according to claim 10, including a stripper sleeve movably positioned on each mandrel, said stripper station including a movable device which engages a portion of the stripper sleeve to move the stripper sleeve towards a free end of the mandrel to remove the pouring device and pack from the mandrel.

15. A device according to claim 10, including means for holding a pouring device on an outer end of each of the mandrels.

16. A device according to claim 10, wherein said at least two mandrels includes four mandrels extending radially from the hub of the mandrel wheel at equally spaced apart angular distances.

17. A device according to claim 10, wherein said final heating station and said pre-heating station each include at least one thermal hollow body which is movably driven towards and away from a mandrel located at the respective final heating station and pre-heating station.

18. Method of arranging a pouring device made of sealable plastic material at a hole located in an end of a pack made of deep-drawable plastic material, comprising:

removably positioning a pouring device on a mandrel of a mandrel wheel, the pouring device including an annular lower part provided with a pouring opening and a closure part hingedly connected to the lower part;

moving the pouring device to position the pouring device adjacent a pre-heating station;

pre-heating the pouring device at the pre-heating station;

moving the mandrel wheel in a translatory manner to move the pouring device from the pre-heating station to a final heating station;

heating the pouring device at the final heating station to a sealing temperature;

moving the heated pouring device to a sealing station at which is located a pair of deep-drawn shell parts which have facing surfaces to be sealed together to form a pack, the pouring device being moved to position a portion of the pouring device between a portion of the facing surfaces of the shell parts;

sealing the pouring device to the shell parts while simultaneously sealing the facing surfaces of the shell parts to one another to form a pack with a pouring device; and removing the pouring device and the pack from said mandrel.

* * * * *